United States Patent [19]

Gaylin

[11] Patent Number: 4,896,997
[45] Date of Patent: Jan. 30, 1990

[54] CABLE SHEATHING AND BURYING METHOD

[76] Inventor: Wayne L. Gaylin, 2330 Athena Rd., West Linn, Oreg. 97068

[21] Appl. No.: 781,032

[22] Filed: Sep. 27, 1985

[51] Int. Cl.$^4$ .......................... E02D 29/10; F16L 1/02
[52] U.S. Cl. ................................... 405/156; 405/157; 405/183; 405/174; 138/128; 29/450
[58] Field of Search ................................. 405/174–183, 405/156, 157; 29/429, 450, 453, 235, 33 D, 33 E, 33 T, 564.2; 138/128, 156, 108, 111

[56] References Cited

U.S. PATENT DOCUMENTS

| | | | |
|---|---|---|---|
| 3,132,416 | 5/1964 | Hait | 405/117 X |
| 3,183,300 | 5/1965 | Jachimowicz et al. | 138/128 X |
| 3,456,449 | 7/1969 | Heil . | |
| 3,611,596 | 10/1971 | Bright et al. | 405/180 X |
| 4,003,122 | 1/1977 | Overmyer et al. | 29/450 X |
| 4,014,175 | 3/1977 | Brink | 405/183 |
| 4,170,817 | 10/1979 | Adam | 29/450 |
| 4,201,607 | 5/1980 | Rautenberg et al. . | |
| 4,212,097 | 7/1980 | Portinari et al. | 29/450 |
| 4,279,470 | 7/1981 | Portinari et al. . | |
| 4,318,638 | 3/1982 | Promersberger et al. | 405/178 X |
| 4,430,022 | 2/1984 | Kinnan . | |
| 4,437,789 | 3/1984 | Kasiewicz | 405/174 X |
| 4,448,567 | 5/1984 | Tsuda | 405/156 X |

Primary Examiner—Randolph A. Reese
Assistant Examiner—Arlen L. Olsen
Attorney, Agent, or Firm—Kolisch, Hartwell & Dickinson

[57] ABSTRACT

The apparatus of the instant invention includes a surface traversing mobile frame which, in the preferred embodiment, transports the elements of the invention. Means for dispensing a continuous length of hollow sheath and for dispensing a continuous length of signal-transmitting cable are provided. An assembly table for inserting the cable into the interior of the sheath includes a device for dividing a side of the sheath. Devices for forming a subsurface trench and for training the assembly produced by the assembly are mounted on the frame.

The method of the invention includes opening the side of a hollow sheath along its length, and directing a cable into the opening to produce an elongate, continuous assembly of sheath having the cable inside of it. The wall of the plastimer sheath is permitted to assume a non-joined, closed condition along the region previously opened. A trench is formed to receive the assembly and the assembly is subjected to bending as it travels into the trench, the non-joined condition of the sheath accommodating distortion and flattening of the sheath of the assembly during such bending. The sheath is then placed in the trench.

6 Claims, 2 Drawing Sheets

CABLE SHEATHING AND BURYING METHOD

BACKGROUND AND SUMMARY OF THE INVENTION

The instant invention relates to an apparatus and method for depositing subsurface a continuous length of sheath-enclosed signal-transmitting cable. Specifically, the apparatus and method of the invention provides for the burying of a tension-sensitive material, such as a fiber optic or coaxial cable, in a plastimer sheath which protects the cable from compaction, compression and rodents.

A variety of techniques are known for burying signal-transmitting cable. In most cases, the cable to be buried has already been enclosed in a sheath and the sheath, particularly when it is necessary to prevent damage to the cable by chewing rodents, has been armored with a metal covering. The provision of metal armor about the cable greatly increases the cost of the complete assembly. Additionally, in the case of cables which are tension sensitive, such as fiber optic or coaxial cables, the introduction of the cable into a sheath at a point of manufacture and the subsequent winding of the completed assembly on a supply roll may cause undesirable stress in the cable. Placing a fiber optic or coaxial cable under stress can result in loss of signal carrying ability or outright damage to the cable.

An object of the instant invention is to provide an apparatus for depositing subsurface a continuous length of sheath-enclosed signal-transmitting cable.

Another object of the instant invention is to provide an apparatus for dividing or splitting a sheath and placing loosely a signal-transmitting tension-sensitive cable therein at a job site.

A further object of the instant invention is to provide an apparatus which will place a signal-transmitting cable in a divided sheath and allow burying of the assembly formed thereby underground with the division maintained in the sheath.

Another object of the instant invention is to provide an apparatus which will allow the easy bending of a cable-containing sheath and which will orient a split in the sheath to the outside of a curve during placement of the sheath in a trench.

A further object of the instant invention is to provide an apparatus for inserting a cable in a sheath where the sheath is substantially rodent-resistant.

Still another object of the instant invention is to provide an apparatus for burying a split sheath with the split oriented downwards in a trench.

Another object of the instant invention is to provide an apparatus for enclosing a tension-sensitive cable in a sheath, and subjecting the sheath with the cable loosely received therein to bending without placing the cable under tension.

Still another object of the instant invention is to provide a method of depositing subsurface a continuous length of sheath-enclosed cable wherein the sheath is initially opened, the cable inserted therein and the assembly then buried subsurface with wall of the sheath, about the opening, remaining in a non-joined, closed condition. The non-joined condition accommodates distortion and flattening of the sheath during a bending process as the sheath-enclosed cable assembly is buried.

The apparatus of the instant invention includes a surface traversing mobile frame which, in the preferred embodiment, transports the elements of the invention. Means for dispensing a continuous length of hollow sheath and for dispensing a continuous length of signal-transmitting cable are provided. An assembly table for inserting the cable into the interior of the sheath includes a device for dividing a side of the sheath. Devices for forming a subsurface trench and for training the assembly produced by the assembly table are mounted on the frame.

The method of the invention includes opening the side of a hollow sheath along its length, and directing a cable into the opening to produce an elongate, continuous assembly of sheath having the cable inside of it. The wall of the plastimer sheath is permitted to assume a non-joined, closed condition along the region previously opened. A trench is formed to receive the assembly and the assembly is subjected to bending as it travels into the trench, the non-joined condition of the sheath accommodating distortion and flattening of the sheath during such bending. The sheath is then placed in the trench.

These and others objects and advantages of the instant invention will become more fully apparent as the description which follows is read in conjunction with the drawings.

DETAILED DESCRIPTION OF A PREFERRED EMBODIMENT

Figure 1:
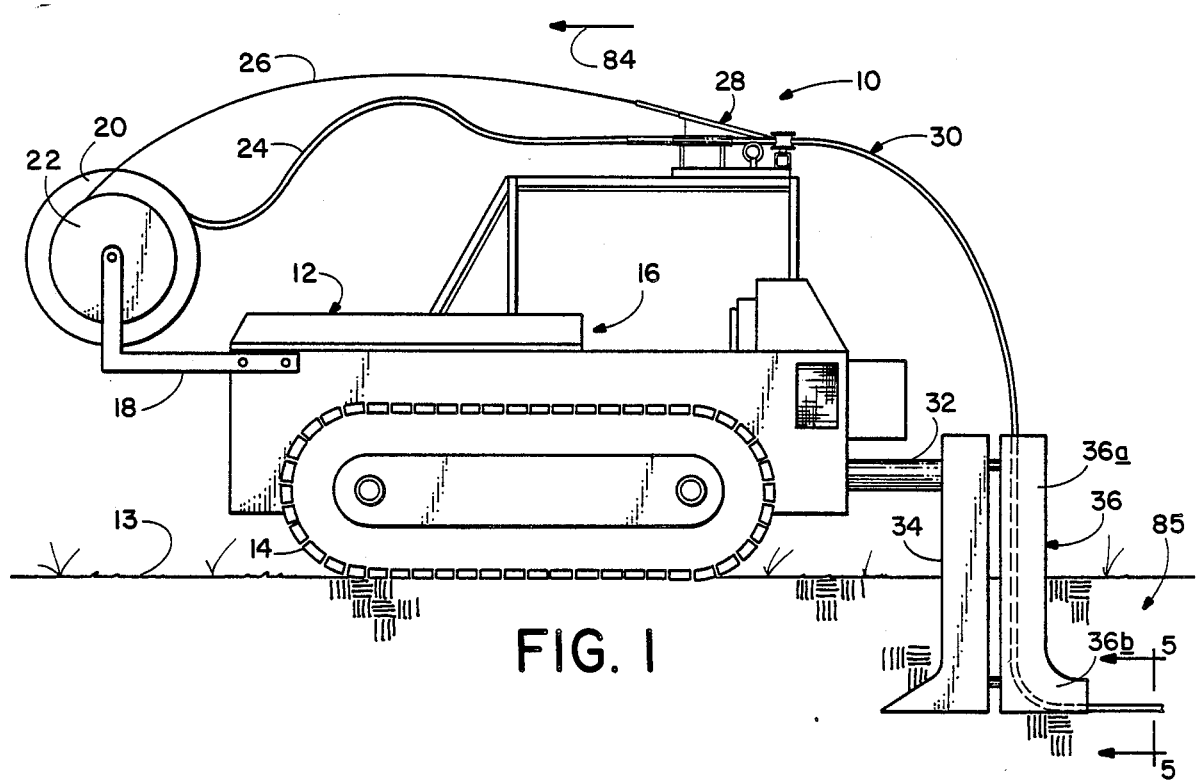
FIG. 1 is a side elevation of a mobile frame having the elements of the invention mounted thereon.

Turning now to the drawings, and initially to FIG. 1, an apparatus for depositing a sheath-enclosed signal-transmitting cable is shown generally at 10. Apparatus 10 includes a tractor 12, also referred to herein as a surface traversing mobile frame means. Tractor 12 moves over a surface 13 on powered tracks 14 and is operated from control cab 16.

A pair of spool-carrying brackets 18 are mounted on the front of tractor 12 and carry a sheath spool 20 and a cable spool 22. Spool 20 dispenses a continuous length of hollow sheath 24 and spool 22 dispenses a continuous length of signal-transmitting cable 26. Sheath 24 and cable 26 are fed to an assembly table 28 which inserts cable 26 into the hollow interior of sheath 24, thereby forming a continuous conduit assembly 30.

A shaft 32 extends from the rear of tractor 12 and has a plow 34 and a conduit-assembly training guide 36 mounted thereon. During normal operation, plow 34 and guide 36 are stationary with respect to the vehicle.

Figure 2:
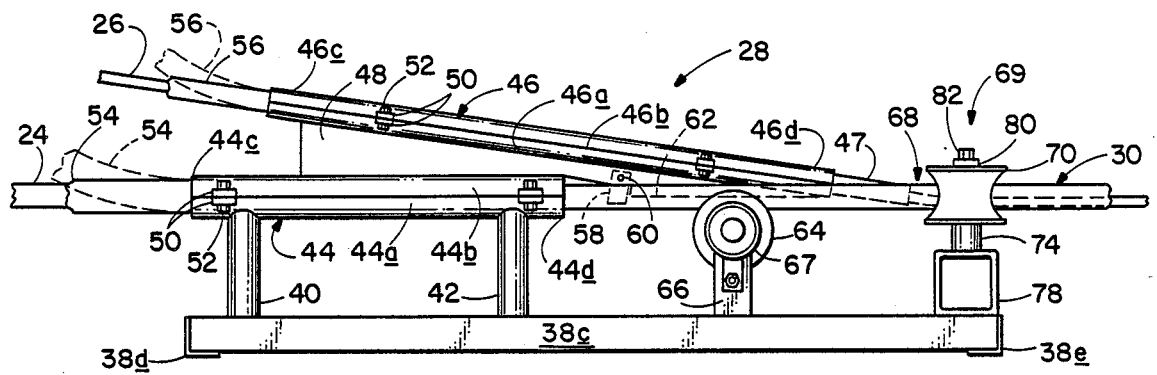
FIG. 2 is a side view of an assembly table constructed according to the invention.
Figure 3:
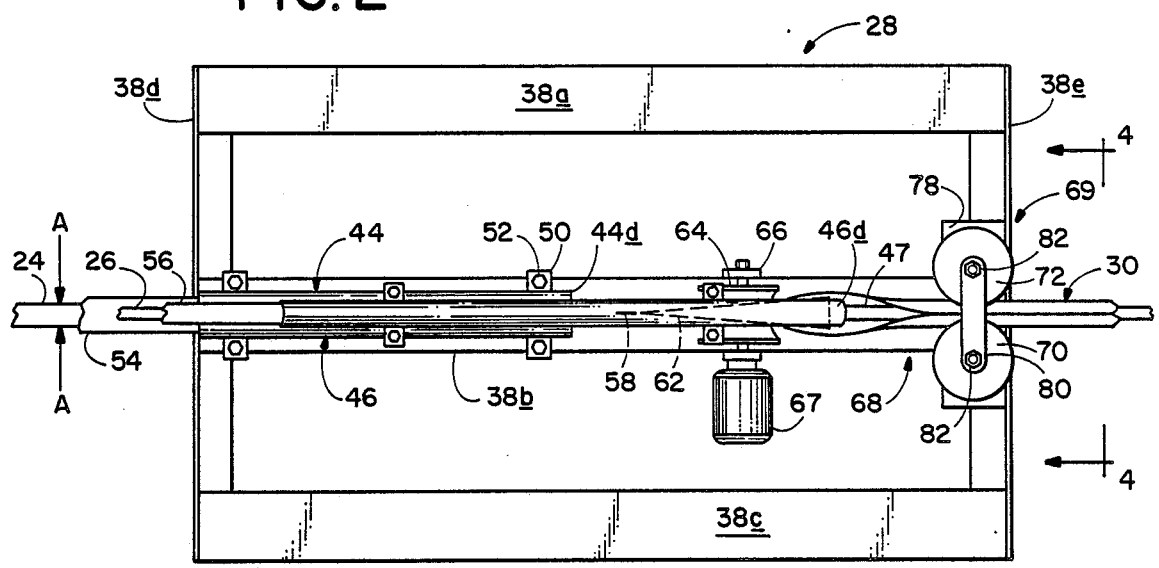
FIG. 3 is a top plan view of the table of FIG. 2.

Turning now to FIGS. 2 and 3, an assembly table, or assembly table means, 28 is shown in greater detail. Table 28 includes a base 38, which in the preferred embodiment includes longitudinal members 38a, 38b and 38c, and transverse members 38d and 38e. Supports 40, 42 are affixed to longitudinal member 38b and support a hollow, elongate sheath guide 44. Sheath guide 44 includes a first guide segment 44a and a second guide segment 44b which, in the preferred embodiment, form the lower and upper halves of guide 44. Segments 44a and 44b have flanges 50 attached thereto which are operable, with fasteners 52, to hold the segments together, thereby forming the complete guide.

A hollow cable guide 46 is supported above sheath guide 44 by a cable guide support 48. Guide 46 includes a first guide segment 46a and a second guide segment 46b.

Guide 44 may have a flexible receiver portion 54 mounted on an infeed end 44c thereof. Likewise, guide 46 may have a flexible receiver portion 56 mounted on an infeed end 46c thereof. Sheath and cable entering receivers 54, 56, respectively, pass through the hollow interior of guides 44, 46, respectively, and exit the guides at outfeed ends 44d, 46d, respectively. Cable guide 46 has a guide extension 47 fixed to its outfeed end.

Undivided sheath leaving outfeed end 44d encounters a knife blade 58. Knife 58 is, in the preferred embodiment, mounted on the guide segment 46a. Knife 58 is held in place by a set screw 60. A divider element 62 is mounted, with reference to the movement of sheath 24 past assembly table 28, on segment 46a downstream of knife 58.

A roller, or sheath engaging means, 64 is mounted on a bracket 66. A motor 67 drives roller 64 to draw sheath 24 past knife 58. Roller 64 also directs the now split or divided sheath 24 towards extension 47 where cable 26 is inserted into the hollow interior of sheath 24. This juncture is also referred to as an assembly point 68.

Figure 4:
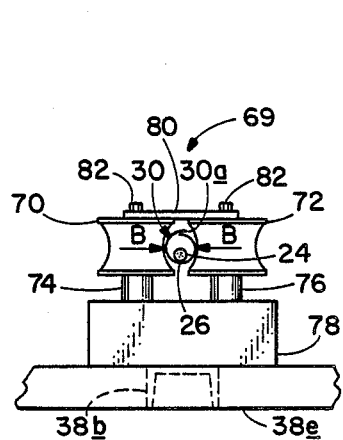
FIG. 4 is an end view of a portion of the assembly table taken generally along line 4—4 of FIG. 3.

Referring now to FIGS. 3 and 4, closure means 69 includes a pair of rollers or closing surfaces, 70, 72, which are mounted on shafts 74, 76. The shafts are secured to a support 78, mounted on longitudinal member 38b. A cross piece 80 extends between shafts 74, 76 and is held in place by fasteners 82.

OPERATION

In operation, spools 20, 22 are loaded onto brackets 18 and a length of sheath 24 and cable 26 directed towards receiver portions 54, 56, respectively. Receiver portions 54, 56 are operable to direct cable 26 and sheath 24 to the infeed ends of their respective guides and to flex, thereby preventing marring of the exterior of the cable and sheath as they enter the guides. It should be remembered, and referring to FIG. 1, that the material such as sheath 24 exiting from spool 20 does not normally travel in a straight expanse, but instead extends in twists and bends.

Referring now to FIGS. 2 and 3, a length of sheath having outside diameter A—A is drawn through receiver 54 into guide 44, exiting outfeed end 44d. The sheath is then drawn over knife 58 by roller 64 where a side of the sheath is split. As the sheath is drawn over divider element 62, the split side of the sheath is opened along a region 30a thereof, allowing the introduction of cable 26 into the hollow interior of sheath 24. Roller 64 provides a slight bend in sheath 24 and assists divider element 62 in opening the sheath. Sheath 24, due to its inherent characteristics, will tend to close as it passes assembly point 68 and will generally close in an overlapped condition. The sheath, with the cable inserted therein, is drawn through closure means 69 where rollers 70 and 72 both guide the now assembled conduit 30.

Referring now to FIG. 4, the grooves of rollers 70, 72 are spaced apart by a distance B—B, which ordinarily is somewhat less than sheath o.d. A—A. This spacing ensures that an overlap is present with the now closed, but non-joined walls of the sheath region 30a.

Cable 24, as previously noted, is a tension-sensitive cable. The cable may be a coaxial cable or it may be a fiber optic cable. In either case, it is important that the cable be loosely received in sheath 24 such that the cable will not be placed under tension, or stress, while the sheath with the cable received therein is transported from the assembly point to its final resting spot in the ground.

It may be desirable to combine receiver portion 56 with extension 47 to provide a continuous, smooth inner lining in guide 46. Such a lining could be a teflon-type tube. If cable 26 were of the fiber optic type, such a lining would prevent marring of the outer surface of the cable. In any case, such a lining would provide resistant free movement of the cable through the guide.

Conduit 30 is then drawn towards training guide 36 where it is passed through an upper portion of the training guide 36a and down to a curved region 36b thereof.

As tractor 12 moves forward, in the direction of arrow 84, plow 34, also referred to herein as trench forming means, will cut a trench 85 into which conduit assembly 30 will be deposited. The conduit may be anchored in the trench thereby drawing sheath 24 and cable 26 through assembly table 28 and training guide 36 as tractor 12 continues forward.

Figure 5:
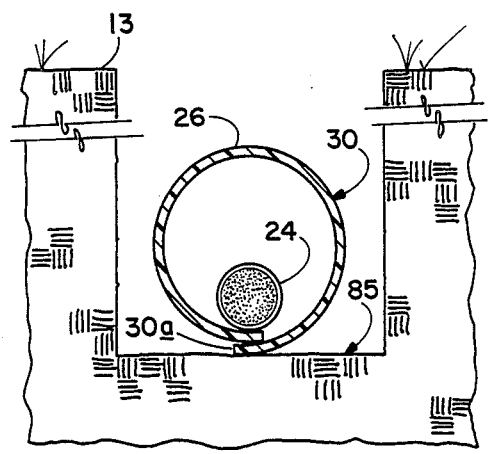
FIG. 5 is an enlarged, cut-away view of conduit assembly which has been deposited in a trench, taken generally along the line 5—5 of FIG. 1.

As conduit 30 leaves assembly table 28, the divided region 30a is on the top side of the conduit assembly. As the assembly makes its way around curve 36b, the presence of the division in region 30a of the assembly causes the assembly to twist, bringing region 30a to the outside of the bend caused in conduit 30 by curve 36b and ultimately results in region 30a being deposited in the trench facing the bottom of the trench, FIG. 5.

Cable 26 generally has a diameter of 0.5 inches (1.25 cm.). If the cable is stressed, it may be bent about a curve having a radius approximately ten times the diameter of the cable. A 0.5 inch diameter cable would therefore withstand a bend having a minimum radius of 5 inches (12.70 cm.). The same cable may be bent about a curve having a radius 20 times that of the cable diameter to avoid placing the cable under any stress whatsoever. Such a curve would have a radius of 10 inches (25.4 cm). In the preferred embodiment, curve 36b has a radius of 24 inches (60.96 cm.).

After conduit 30 has been placed in trench 85, the trench is generally partially filled with rocks and/or gravel, and the trench then filled in with ground. Conduit 30 usually will be buried at a depth of two feet, although plow 34 and training guide 36 may be provided with adjusting means to vary the depth of the bottom of trench 85 to any desired depth.

Because the cable is loosely received in the sheath, it is unlikely that the cable spool and the sheath spool will empty simultaneously. The provision of first and second segments in the guides allow a cable or sheath to be spliced without the need to splice the other component of the assembly. A guide may be opened while the other guide remains closed about the component passing therethrough.

As previously noted, known methods of burying tension-sensitive cables involves enclosing the cables in multiple layers of sheath material which may include cementitious material or metallic armor coating. The apparatus and method of the instant invention allows the placing of a cable in the ground in a single protective sheath which retains a non-joined closed region. This region so-formed initially facilitates bending of the sheath as it is placed in the ground. The placing of the region downward in the trench keeps foreign matter out of the interior of the sheath and allows any moisture which collects in the interior of the sheath to drain out. Once the assembled conduit has been placed in the ground and the trench filled in, the sheath will adjust its size according to the compression and compaction of the ground about its periphery. This is particularly important where the ground freezes and thaws and changes density in the process. As ground freezes, it will tend to exert more pressure on the outer surface of the sheath. Were the sheath a solid structure, the increased pressure could contort the sheath and potentially place the tension-sensitive cable therein under stress. Because the sheath remains divided, its diameter may decrease in response to increased external pressure.

An important feature of the apparatus and method of the instant invention is the provision of a plastimer sheath which is substantially rodent-proof. As previously noted, known techniques for rodent-proofing an underground cable generally include some form of armor about the cable, which may take the form of a cementitious mixture or may be a metallic armor. The provision of a cementitious mixture is a particularly difficult and expensive procedure and the use of metal as an armor can result in induced electrical interference in the cable, which will affect the cable's ability to carry the desired signals.

Of primary concern in many areas is the damage done to buried cables by rodents, specifically, gophers, or other large, burrowing animals. These animals generally are presumed to have a maximum 1.5 inch (3.81 cm.) bite. The provision of a sheath having a two inch outside diameter will prevent such a rodent from getting a grip on the sheath and thus precludes the rodent from biting through the cable. A nominal 2 inch (5.08 cm.) o.d. sheath will generally have a 1.3-1.5 inch (3.30-3.81 cm.) i.d. and will have a ⅛-¼ inch (0.31-0.64 cm.) sidewall. Such a sheath provides adequate internal space for a cable having a nominal 0.5 inch (1.27 cm.) o.d.

Figure 6:
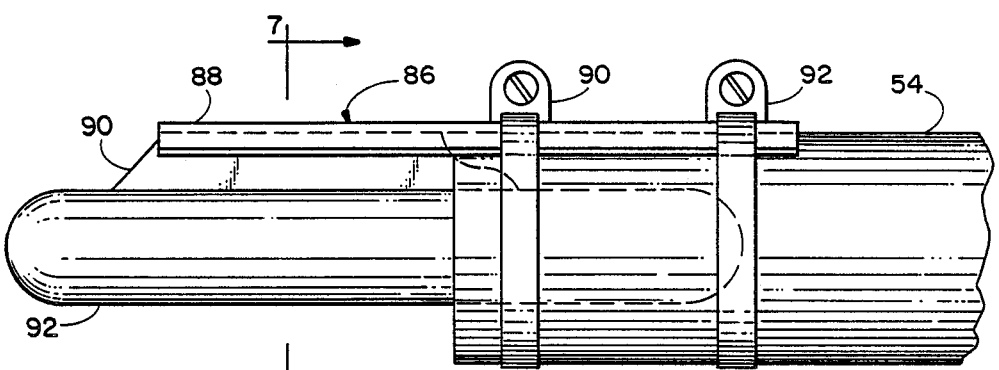
FIG. 6 is a side elevation of an orienting device constructed according to the invention.
Figure 7:
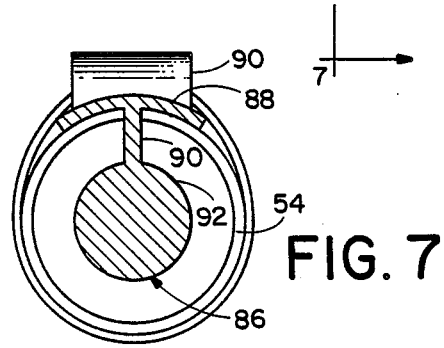
FIG. 7 is a cross section of the orienting device of FIG. 6 taken generally along line 7—7 of FIG. 6.

In some instances, the sheath may be pre-split, having had a division made in it side during manufacture or at some point prior to arriving on the installation site. In this case, it is necessary to orient the division in the sheath prior to the sheath reaching the assembly point. Referring now to FIGS. 6 and 7, a device to orient a side of the sheath on the feed side of a dividing element is shown generally at 86. Device 86 includes a mounting bracket 88 which is secured by clamps 90, 92 to the free end of flexible portion 54 associated with sheath guide 44. A downward extending portion 90 is engageable with a split in a sheath to orient the sheath in advance of divider element 62. A guide plug 92 is fixed to portion 90 to provide longitudinal guidance of the sheath as it passes along portion 90.

In some instances, sheath 24 may be provided with flanges extending along the length thereof which would be oriented, prior to reaching the dividing means, in a specific relationship, such that the split formed in the side of the sheath would be in a known position relative to the flanges. Orienting device 86 could be modified to position such flanges relative to the dividing means or divider element.

Although a preferred embodiment of table 28 has been shown with a single cable guide, it should be appreciated that, particularly in the case of a large sheath, it is possible and probably desirable to introduce more than a single cable into a sheath. Provision of additional cable guides and spools on assembly table 28 and vehicle 12, respectively, would easily accomplish insertion of multiple cables into the sheath.

Thus, an apparatus and a method for using the apparatus have been disclosed which will enable the burying of a conduit assembly containing a tension-sensitive signal-transmitting cable therein. The apparatus and method are particularly suitable to providing a buried conduit in areas that may have a rodent population which would gnaw on buried cables. Additionally, the apparatus and method allow the burying of a cable which is loosely received in the protective sheath with a division being maintained in a region of the sheath. A cable enclosed in such a sheath will not be subjected to stress once the assembly is covered over and is subjected to environmental changes.

Although a preferred embodiment of the instant invention has been disclosed, it should be appreciated that variations and modifications may be made thereto without departing from the spirit of the invention.

It is claimed and desired to secure by Letters Patent:

1. A method of depositing subsurface a continuous length of sheath-enclosed fiber optical cable comprising:
   opening a side of a hollow, plastimer sheath along the length thereof;
   directing a fiber optical cable into the opening of the sheath thereby producing an elongate, continuous assembly of the sheath with the cable inside it;
   permitting the wall of the plastimer sheath, through memory, to assume a non-joined, closed condition along a region of the sheath extending along a side thereof, said non-joined, closed condition being assumed with the wall of the sheath reaching a overlapped condition in said region, the sheath having an inner diameter substantially exceeding the outer diameter of the cable in the assembly;
   forming a trench for receiving the assembly;
   and after the closed condition is reached, subjecting the assembly to bending as it travels into the trench, said nonjoined closed condition accommodating distortion of the assembly during said bending; and
   placing the assembly in said trench.

2. A method of continuously laying a sheath-protected cable assembly in a trench to provide an underground installation of the assembly and utilizing a vehicle means movable along the lien of the trench during the laying of the assembly comprising:
   providing on the vehicle an elongate stored supply of a plastic tubular sheath having a hollow interior, and an elongate stored supply of cable;
   in an assembly station on the vehicle and on drawing of the sheath through the station, opening the sheath along the wall thereof in a region extending along the length of the sheath and loosely lodging the cable within the interior of the sheath by directing the cable into the opening with the cable then becoming loosely lodged within the sheath encompassing it;
   the plastic sheath provided having a wall which, through memory and after opening, seeks a non-joined, closed condition along said region with the wall closing an itself in said region to produce a tight overlap of the sheath wall;

after lodging of the cable permitting the wall of the sheath, through memory, to assume said non-joined, closed condition and to produce a tight overlap along said region and an assembly comprising the cable extending along the sheath with such loosely disposed therein;

after the assembly exits the assembly station and in a training zone, training the assembly in bends whereby the assembly, on leaving the zone, extends along the trench and anchoring the assembly through anchoring of the sheath within the trench with such assembly deposited in the trench;

vehicle movement along the trench with the sheath so-anchored serving to produce drawing of the plastic sheath in the assembly through the assembly station and thench through the training zone whence the assembly reaches its deposited position in the trench.

3. A method of laying a sheath-protected cable assembly in a trench to provide an underground installation of the assembly, which comprises:

providing an elongate expanse of plastic tubular sheath having a hollow interior;

opening the sheath along the wall thereof in a region extending along the length of the sheath and loosely lodging the cable within the interior of the sheath by directing the cable into the opening with the cable then becoming loosely lodged with the sheath encompassing it;

the plastic sheath provided having a wall which through memory and after opening seeks a non-joined closed condition along said region with the wall of the sheath closing on itself to provide a tight overlap of the sheath wall in said region;

after lodging of the cable, permitting the wall of the sheath through memory to assume said non-joined closed condition along said region and to produce a tight overlap along said region and an assembly comprising the cable extending along the sheath with such loosely disposed therein; and placing the sheath and cable assembly within the trench with the overlap in said region maintained by said memory in the sheath wall, and then filling in the trench and overlaying the assembly with fill material to produce the underground installation.

4. The method of claim 3, wherein placement of the assembly in the trench is with the tight overlap of said sheath wall in said region facing the bottom of the trench.

5. The method of claim 4, wherein the tubular sheath provided has a continuous circumferential wall, and opening is by slitting the wall of the sheath and separating the wall where slit.

6. The method of claim 4, wherein the tubular sheath provided has a continuous circumferential wall and opening is by slitting the wall of the sheath and separating the wall where slit, and wherein after lodging of the cable and permitting the wall of the sheath to assume said non-joined closed condition the assembly is bent as such travels into the trench about an arc where the convexity of the arc faces downwardly in the trench with such bending of the assembly serving to locate said region facing downwardly in the trench.

* * * * *